Figure 1:
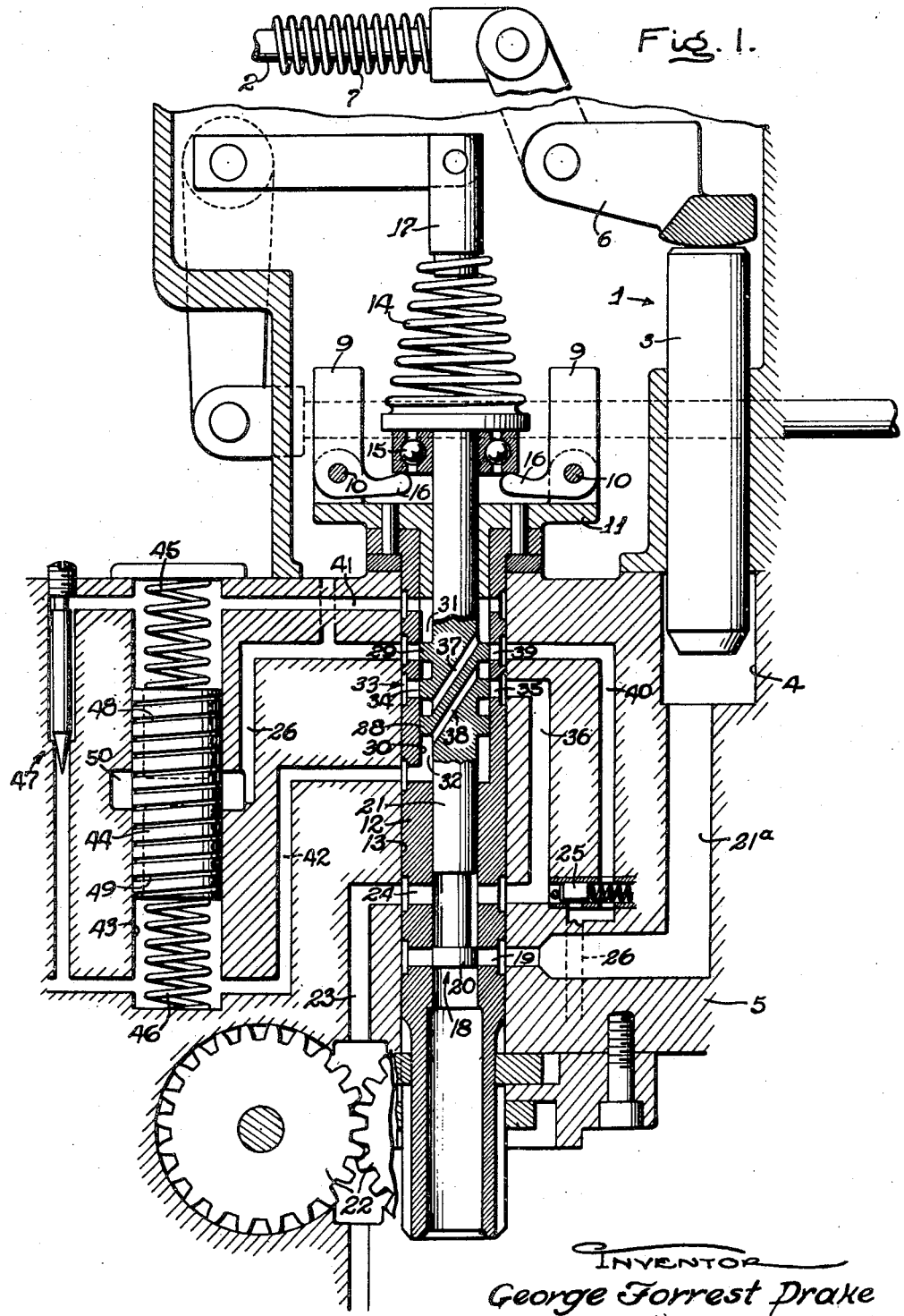

Aug. 9, 1949. G. F. DRAKE 2,478,752
CONDITION CONTROL APPARATUS
Filed July 21, 1948 2 Sheets-Sheet 1

INVENTOR
George Forrest Drake
By Carlson, Pitzner, Hubbard & Wolfe
ATTORNEYS

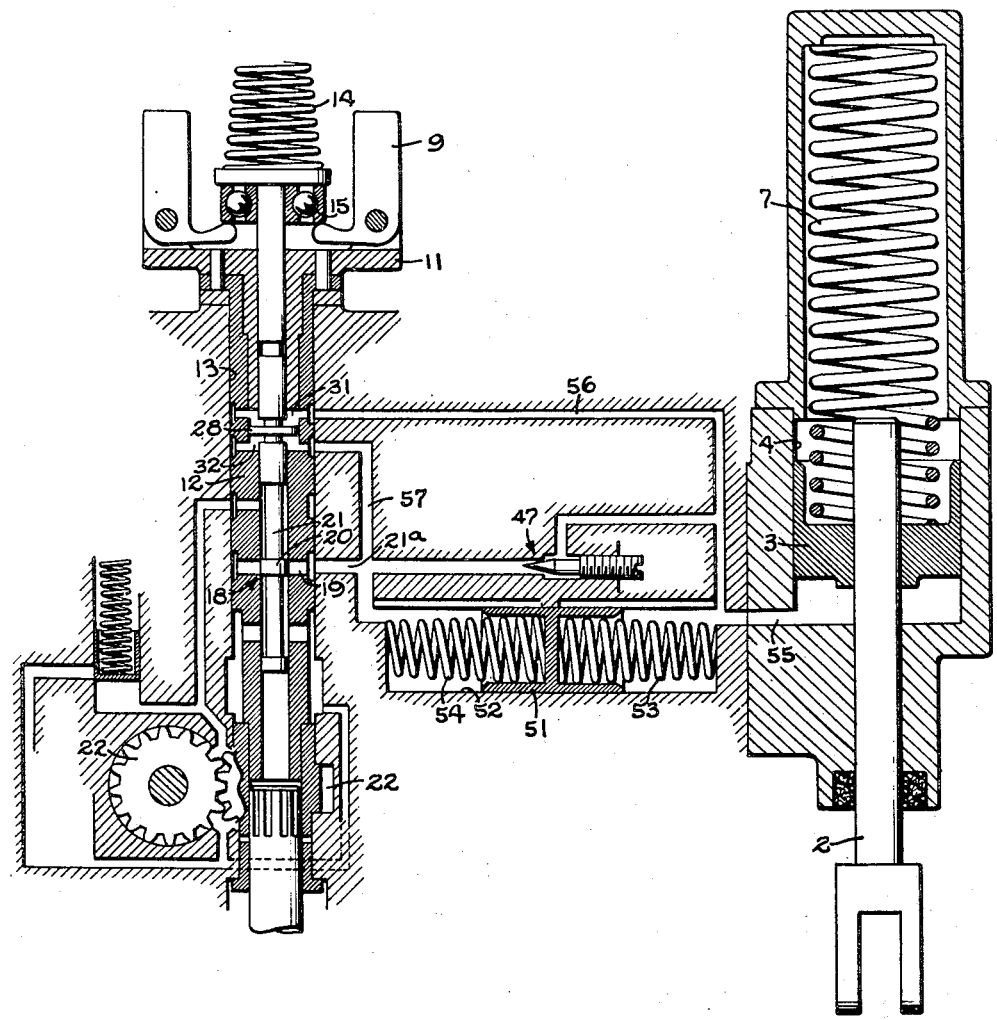

Patented Aug. 9, 1949

2,478,752

UNITED STATES PATENT OFFICE 2,478,752

CONDITION CONTROL APPARATUS

George Forrest Drake, Rockford, Ill., assignor to Woodward Governor Company, Rockford, Ill., a corporation of Illinois Application July 21, 1948, Serial No. 39,992

12 Claims. (Cl. 121—42)

1

This invention relates to apparatus for controlling the operation of a servo or power actuator in accordance with variations in a control force and has more particular reference to apparatus having mechanism of the fluid pressure type for modifying the control force to produce a temporary drooping characteristic for stabilizing the controlled apparatus and restore the controlled condition at a desired equilibrium value in spite of wide variations in the load on the servo actuator.

One object of the present invention is to provide a fluid actuated compensating mechanism in which the compensating force is derived in a novel manner.

Another object is to derive the compensating force by the action of a valve operated by the motion of the control element by which the energization of the servo is varied with changes in the control force.

A more detailed object is to produce the modifying or compensating force through the use of an auxiliary valve operated in response to changes in the control force.

The invention also resides in the novel construction and arrangement of the parts of the auxiliary valve and the means for receiving the compensating force.

Other objects and advantages of the invention will become apparent from the following detailed description taken in connection with the accompanying drawings in which Figure 1 is a fragmentary sectional view, partially diagrammatic, of a control apparatus embodying the present invention.

Fig. 2 is a similar view of a modified form of the control apparatus.

For purposes of illustration, the improved compensating mechanism is shown in Fig. 1 of the drawings incorporated in a hydraulic governor which operates to measure variations in a control force such as a force derived from changes in the speed of a prime mover and to correspondingly vary the operation of a servomotor 1 for positioning a rod 2 connected to a speed regulator, such as a throttle, control valve, propeller pitch controller or the like. The servomotor shown is of the single acting hydraulic type comprising a piston 3 reciprocable in a stationary cylinder 4 supported within the governor housing 5. The piston is connected to the rod 2 through a bell crank 6 and is urged in the speed-decreasing direction to the right by a compression spring 7.

Various types of means may be employed to detect and measure deviations of the controlled condition or speed from the value desired to be maintained. Herein, the detecting means comprises upstanding weights 9 pivoted at 10 on a head 11 which is fast on the upper end of a ported sleeve 12 rotatable in a bore 13 of the casing 5. The lower end of the sleeve is splined for connection to a shaft driven by the prime mover to be controlled by the governor. The centrifugal force acting on the flyballs is balanced against a compression spring 14 bearing downwardly against the inner race of a ball thrust bearing 15 whose outer race is engaged by arms 16 of the flyballs. The speed-setting of the governor may be adjusted by manually shifting a member 17 to vary the stress of the speeder spring.

The control force derived from changes in the flyball positions is applied to a control device in the form of a pilot valve 18 formed by ports 19 in the sleeve 12 coacting with a land 20 on the lower end of a stem 21. The latter is slidable in the rotating sleeve and is connected at its upper end to the inner race of the bearing 15. The valve controls the flow of pressure fluid or oil into or out of a passage 21ª leading to the servo cylinder 4.

Fluid at a constant super-atmospheric pressure is supplied by a pump including gears 22, one of which is connected to the lower end of the drive shaft 12. Through a passage 23, an annular passage in the sleeve, and holes 24, oil supplied under pressure by the pump is delivered into the sleeve above the land 20, the supply pressure being maintained constant by a spring loaded relief valve 25 having a by-passage communicating with sump passages 26.

When the land 20 is lowered below the ports 19 in response to a speed decrease below the prevailing governor setting, oil will flow through the passage 21a into the servo cylinder moving the piston 3 upwardly to increase the delivery of power by the prime mover. Conversely, raising of the land above the ports 19 in response to a speed increase allows fluid in the servo cylinder to escape to the sump, thereby allowing the servo piston to be moved by the spring 7 to decrease the energy supply.

To stabilize the apparatus described above, a modifying or compensating force is applied to the valve stem 21 when a speed deviation is detected, such force opposing the primary control or flyball force to produce a drooping characteristic. This modifying force is exerted on a receiving piston herein formed by piston elements or lands 28 and 29 rigid with and axially spaced along the valve stem 21 and slidable in a cylinder 30 formed within the rotating sleeve 12. Fluid filled chambers 31 and 32 are thus formed within the sleeve above and below the force receiving piston 28, 29 whose oppositely facing effective pressure areas are of equal size in the present instance.

In systems of the above character, the droop-producing force is frequently derived from the motion of the servo. To accomplish this without the necessity of extending a motion-transmitting connection from the servo back to the compensating receiving piston 28, 29, I take advantage of the fact that the servo displacement, following any speed change, is a function of the displacement of the valve 20 out of its neutral position and the time that such displacement persists. Therefore, in accordance with the present invention, the modifying force is derived from the motion of the control force responsive member 21 by direct and simultaneous valve action. In the form shown in Fig. 1, the valve action is produced by an auxiliary valve 33 which, when open, admits fluid at the constant pump pressure to one or the other of the chambers 31 and 32. Herein, the auxiliary valve comprises a land 34 rigid with the stem 21 between the lands 28 and 29 and cooperating with ports 35 in the sleeve supplied with fluid through a branch passage 36 connected to the pump outlet. To apply the modifying force in the proper direction, that is opposite to the motion of the valve stem 21 caused by a change in flyball or control force, holes 37 and 39 are cross drilled through the valve stem 21 to connect the space between the lands 28 and 34 with the chamber 31 and the space between the lands 29 and 34 with the chamber 32. The land 29 cooperates with sleeve ports 39 to form another valve for connecting a drain passage 40 with the chamber 31 when pressure fluid is supplied to the chamber 32 through the valve 33. Similarly, the chamber 32 is connected to the drain passage 40 through the hole 38 when the valve stem is raised from the neutral position. Motion of the valve stem in response to the modifying force is thus permitted. The lands 20, 29 and 34 and their coacting ports in the sleeve 12 are dimensioned and spaced accurately so that when the main valve land 20 is in the neutral position shown, the lands 29 and 34 are centered with respect to their ports 39 and 35.

To charge one or the other of the chambers 31 and 32 and thereby build up the modifying or droop-producing force gradually, the chambers 31 and 32 are respectively connected through passages 41 and 42 with the chambers at opposite ends of a cylinder 43 in which a wall in the form of a plunger 44 is resiliently movable in either direction away from a normally centered position. This position is maintained by springs 45 and 46 acting in compression against opposite ends of the plunger. The scale of these springs is correlated with the effective areas of the receiving piston 28, 29 so as to provide the desired rate of build up of the modifying force.

The pressure chambers 31 and 32 are interconnected through a restriction in the form provided by a needle valve 47 which permits the slow leakage of fluid between the two chambers, thereby effecting a gradual dissipation of any existing pressure differential so that the droop producing force applied to the valve stem is reduced progressively to zero. It will be apparent that the rate of such restoration is determined by several factors including the area of the plunger 44, the scale of the springs acting thereon, the area of the receiving piston 28, 29, the rate of leakage through the needle valve 47, and the rate of supply of pressure fluid to one or the other chambers 31 and 32, the latter being determined by the magnitude of the detected speed variation.

If desired, an auxiliary leakage passage may be provided between the chambers 31 and 32, the effectiveness of which passage varies according to the position of the plunger 44. For this purpose, helical grooves 48 and 49 are formed around opposite ends of the plunger 44 so as to communicate continuously with a channel 50 formed around the interior of the cylinder 43 intermediate the ends of the latter and communicating with the drain passage 26. Fluid will leak from the charged end of the cylinder 43 at a rate inversely proportional to the effective length of the groove leading along the plunger to the channel 50. Thus, the greater the detected speed deviation, the further the plunger 44 will move away from its centered position, and, therefore, the greater will be the leakage rate.

It will be apparent that the piston 44, its cylinder, and the springs 45 and 46 constitute a double acting accumulator for insuring a gradual build up of the restoring force and for storing energy for maintaining application of the compensating force as it is dissipated gradually by leakage through the valve 47.

In operation, when the engine load is increased, the speed decreases and the flyballs allow the stem 21 to lower correspondingly. Fluid then flows past the land 20 into the servo cylinder raising the piston 3 and increasing the supply of energy to the engine. In the same downward movement, the land 34 is lowered below the ports 35 allowing pressure oil to flow into the chamber 32 and the lower end of the cylinder 43. At the same time, the land 29 uncovers the ports 39 connecting the chamber 31 to the sump so as to permit a flow of fluid out of the chamber 31. The flow of oil into the lower end of the cylinder 43 forces the plunger 44 upwardly compressing the spring 45. The pressure thus created reacts directly against the under side of the piston 28 to exert a force which opposes the detected changes in the control or flyball force and which is effective in moving the valve stem and the land 34 upwardly toward centered position. The drooping characteristic thus introduced serves to stabilize the corrective action.

The energy thus stored in the spring 45 immediately becomes effective to dissipate the droop as permitted by leakage through the needle valve 47 and the restriction 49 which will have been shortened by upward motion of the plunger 44. This leakage permits the valve stem 21 to be lowered allowing more fluid to flow through the main valve 18 to the servo cylinder, thereby correspondingly increasing the supply of energy to the prime mover. This corrective action continues progressively at a comparatively slow rate until the pressure differential between the chambers 31 and 32 has been dissipated and the control point of the governor fully restored under the new load on the engine.

Reverse operation of the parts occurs in response to a decrease in engine load, the valve land 20 being raised by the flyballs and the servo energization being reduced by the drainage of fluid from the cylinder 4. In this movement of the valve stem and the land 34, the ports 33 are uncovered permitting pressure fluid to flow in beneath the land 34 and up through the hole 37 to the chamber 31. The plunger 44 is thus moved downwardly to compress the spring 46 and a modifying force is applied in a downward direction to the receiving piston 29. Under this force, the valve lands 20 and 34 are relatively moved toward centered position and droop is introduced. Thereafter, leakage through the valve 47 and the groove 48 permits the valve stem to rise slowly as an incident to which the servo energization is further decreased and the engine speed restored to the desired value determined by the governor speed setting.

The compensating mechanism above described is especially suited to installations where the servomotor is located remotely from the device for measuring changes in the control force. Thus, the auxiliary valve through which the compensating force is derived is incorporated in the governor thereby avoiding the extension of additional fluid connections between the control valve and the servomotor. Also, the auxiliary valve 33 and the receiving piston 28, 29 constitute a simple and inexpensive unit formed within the main valve sleeve. Since the compensating action is obtained by a pressure build up above atmospheric pressure in one or the other of the chambers 31 or 32, this action is not affected by altitude changes.

Instead of employing an auxiliary valve to control the flow of fluid to and from one of the chambers, the main servo valve 18 itself may be used for this purpose. Such a modification is shown in Fig. 2 in which the parts in common with Fig. 1 bear corresponding reference numerals. The system shown in Fig. 2 hereof forms the subject matter of an application of George E. Parker, Serial No. 667,368, filed May 4, 1946. In this instance, pressure variations in the valve outlet passage 21ª are transmitted to the servo cylinder through the intermediary of a piston 51 movable in a cylinder 52 and urged toward a centered position by opposed springs 53 and 54 which also perform the functions of the springs 45 and 46 in the form first described. The servo cylinder is connected directly to one end of the cylinder 52 through a passage 55 from which a branch passage 56 leads directly to the upper fluid chamber 31 so that the pressure in the latter varies with the energization of the servo.

The other end of the cylinder 52 communicates directly with the fluid passage 21ª which is connected to the other or lower fluid chamber 32 through a passage 57. Thus, the pressure in the latter chamber is controlled directly by the valve 18 and thus responds immediately to changes in the control force. As before, the chambers 31 and 32 are connected through the needle valve 47 in a by-passage between the passages 21ª and 56 so that any pressure differential developed between the chambers is dissipated slowly by leakage through this restriction.

If with the ports at equilibrium as shown in Fig. 2, the control force on the stem 21 increases in the downward direction, the control land 20 will move downwardly to uncover the ports 19 and permit a flow of fluid from the pressure source to the passage 21ª and the left end of the cylinder 52, forcing the piston 51 to the right against the action of the spring 53. Fluid is thus forced out of the other end of the cylinder and into the servo cylinder 4 and the prime mover regulator 2 is moved upwardly to increase the fuel supply and the prime mover speed.

The pressure increase in the passage 21ª is also transmitted to the chamber 32 resulting in the application to the receiving piston 28 of an upwardly directly restoring force. The drooping characteristic thus produced is maintained by the action of the spring 53 on the piston 51 but starts to dissipate immediately by fluid leakage through the restriction 47 between the chambers 31 and 32. When the pressure differential has dissipated completely, the normal control force will have been restored fully and the piston 51 will have returned to balanced position.

If the control force on the stem 21 decreases, the valve land 20 is raised and the energization of the servo is reduced as above described by movement of the piston 51 to the left against the action of the spring 54. A pressure differential is thus created between the chambers 31 and 32 resulting in a force applied to the receiving piston 28 in a downward direction. As before, the droop thus produced is dissipated by the leakage through the needle valve 47, the normal speed of the prime mover being restored when equilibrium again obtains as the buffer piston 51 reaches balanced position.

This application is a continuation-in-part of abandoned application Serial No. 594,568, filed May 18, 1945.

I claim as my invention:

1. Control apparatus having, in combination, a ported sleeve, means providing a source of pressure fluid, a valve stem within said sleeve movable axially in opposite directions away from a neutral position in response to opposite changes of a control force, axially spaced piston elements on said stem cooperating with said sleeve to define fluid filled chambers around the stem beyond the respective piston elements, means yieldably resisting the building up of the pressure in one of said chambers above that in the other chamber, means connecting said chambers through a restriction permitting the slow leakage of fluid therebetween, a land on said stem axially spaced from and disposed between said piston elements and cooperating with a port in said sleeve to permit the flow of pressure fluid from said source into one or the other of the spaces on opposite sides of the land when said stem is out of said neutral position, holes diagonally extending through said stem and each connecting one of said spaces with the chamber on the opposite side of the land whereby one chamber is charged with pressure fluid in response to movement of said stem and piston elements in the direction of such chamber, and valve means permitting the flow of fluid out of either one of said chambers when the other chamber is being charged.

2. Control apparatus having, in combination, a ported sleeve, a source of pressure fluid, a valve stem within said sleeve movable axially in opposite directions away from a neutral position in response to opposite changes of a control force relative to a predetermined value, three axially spaced lands on said stem slidable in the sleeve, the outer sides of the terminal lands defining oppositely facing pressure areas, means defining fluid filled chambers around the stem beyond said areas, means within said stem establishing communication between each chamber and the space between the intermediate land and the other terminal land, means yieldably resisting the building up of the pressure in one of said chambers above that in the other chamber, means connecting said chambers through a restriction permitting the slow leakage of fluid therebetween, a port in said sleeve cooperating with said intermediate land to admit fluid from said source to the space on one side or the other of such land according to the direction of movement of said stem away from said neutral position, and a port in said sleeve cooperating with one of said terminal lands to permit the flow of fluid out of one of said chambers when the other chamber is being charged.

3. Control apparatus having, in combination, a ported sleeve, a source of pressure fluid, a valve stem within said sleeve movable axially in opposite directions away from a neutral position in response to opposite changes of a control force relative to a predetermined value, three axially spaced lands on said stem slidable in the sleeve, the outer sides of the terminal lands defining oppositely facing pressure areas, means defining fluid filled chambers around the stem beyond said areas, means establishing communication between each chamber and the space between the intermediate land and the other terminal land, means yieldably resisting the building up of the pressure in one of said chambers above that in the other chamber, means connecting said chambers through a restriction permitting the slow leakage of fluid therebetween, a port in said sleeve cooperating with one of said lands to admit fluid from said source to one or the other of said chambers according to the direction of movement of said stem away from said neutral position, and a port in said sleeve cooperating with another of said lands to release fluid from one of said chambers while the other chamber is being charged.

4. Control apparatus having, in combination, a ported cylinder, means providing a source of pressure fluid, a valve stem within said cylinder movable axially in opposite directions away from a neutral position in response to opposite changes of a control force, means on said stem providing pressure areas facing away from each other and cooperating with said cylinder to define separate fluid filled chambers, means on said stem cooperating with a port in said cylinder to form a valve which is closed when said stem is in said neutral position and which is opened by movement of the stem in opposite directions whereby to admit fluid from said source to one of said chambers and create a force on one of said areas acting in a direction to return the stem toward said neutral position, means responsive to the movement of said stem for releasing fluid from the other chamber, means yieldably resisting the building up of the pressure in one of said chambers above that in the other chamber, and means connecting said chambers through a restriction permitting the slow leakage of fluid therebetween.

5. Control apparatus having, in combination, a means providing a source of pressure fluid, a member movable axially in opposite directions away from a neutral position in response to opposite changes of a control force, axially spaced lands on said member having pressure areas facing away from each other, means cooperating with said areas to define fluid filled chambers of variable volume, a valve including an element carried by said member and operable upon movement of the member in either direction away from said neutral position to permit the flow of said pressure fluid into one of said chambers and produce a pressure therein acting on one of said pressure areas to return said member toward said neutral position, means yieldably resisting the building up of the pressure in one of said chambers above that in the other chamber, means connecting said chambers through a restriction permitting the slow leakage of fluid therebetween, and means for releasing fluid from one of said chambers while the other is being charged.

6. Control apparatus having, in combination, a ported cylinder, means providing a source of pressure fluid, a valve member within said cylinder movable axially in opposite directions away from a neutral position in response to opposite changes of a control force, means on said member providing pressure areas facing away from each other and cooperating with said cylinder to define separate fluid filled chambers, means on said member cooperating with a port in said cylinder to form a valve which is closed when the member is in said neutral position and which is opened by movement of the member in opposite directions whereby to admit fluid from said source to one of said chambers and thereby create a force on one of said areas acting in a direction to return the member toward said neutral position, means responsive to the movement of said member for releasing fluid from the other chamber, and means yieldably resisting the building up of the pressure in one of said chambers above that in the other chamber.

7. Control apparatus having, in combination, a member movable in opposite directions away from a neutral position in response to opposite changes of a control force, means on said member providing pressure areas facing away from each other, means cooperating with said areas to define separate fluid filled chambers of variable volumes, valve means on said member operable when said member is in said neutral position to interrupt the flow of fluid from said source to either of said chambers and operable selectively by movement of the member in opposite directions to admit fluid from said source to one of said chambers and create a force on one of said areas acting in a direction to return the member toward said neutral position, means yieldably resisting the building up of the pressure in one of said chambers above that in the other chamber, and means connecting said chambers through a restriction permitting the leakage of fluid therebetween and slow dissipation of any pressure differential between the chambers.

8. The combination of, a movable control element, means for applying a variable control force to said element to move the latter in one direction or the other away from a neutral position, a piston carried by said element, means defining liquid filled spaces disposed on opposite sides of said piston, a passageway interconnecting said chambers and having a restriction permitting a slow liquid flow therebetween, means providing a source of fluid under pressure, a valve operable selectively in response to movement of said element out of said neutral position to admit fluid from said source to one of said chambers and change the pressure therein according to the extent of such movement and in a direction to return said element toward said neutral position, and energy storing means energized selectively by relative pressure changes in said chambers and operable to continue the application of the secondary force on said piston while the pressure differential decreases progressively by leakage of fluid through said restriction.

9. Control apparatus having, in combination, a fluid pressure servo actuator, means providing a source of fluid under pressure, a member movable in opposite directions away from a neutral position in response to opposite changes of a control force, means on said member providing oppositely facing pressure areas, means cooperating with said areas to define separate fluid filled chambers at all times isolated from said actuator, a main valve actuated by said member to control the flow of fluid from said source to said servo actuator, an auxiliary valve separate from said main valve and actuated by said member and selectively controlling the flow of fluid from said source to one or the other of said chambers to produce a pressure on said member in a direction to restore the member toward said neutral position, means yieldably resisting the building up of the pressure in one of said chambers above that in the other chamber, and means connecting said chambers through a restriction permitting the leakage of fluid therebetween and the slow dissipation of any pressure differential therebetween.

10. Control apparatus having, in combination, a fluid pressure servo, means providing a source of fluid under pressure, a member movable in opposite directions away from a neutral position in response to opposite changes of a control force and having oppositely facing pressure areas of equal size, means cooperating with said areas to define separate fluid filled chambers, the fluid pressure in one of said chambers varying with changes in the pressure energization of said servo, valve means actuated by movement of said member to change the energization of said servo according to the direction of movement of the member and simultaneously and directly to control the flow of fluid from said source to the other of said chambers or to release fluid from said such chamber whereby to produce a pressure differential and a resultant force acting on said member in a direction to restore the latter toward said neutral position, means yieldably resisting the building up of a pressure differential between said chambers, and means connecting said chambers through a restriction permitting the leakage of fluid therebetween to dissipate said pressure differential slowly.

11. Apparatus for controlling the energization of a fluid pressure actuated servo from a source of fluid under pressure comprising, a passage adapted for connection to the servo, a member movable in opposite directions away from a neutral position in response to opposite changes in a control force, means connected to said member and providing oppositely facing pressure areas of equal size, means cooperating with said pressure areas to define separate fluid filled chambers isolated hydraulically from said servo passage, a main valve actuated by movement of said member to control the flow of fluid between said source and said passage, a separate valve actuated by said member to control the flow of fluid from said source to at least one of said chambers and produce a pressure differential between said chambers and a resultant force for restoring said member toward said neutral position, means yieldably resisting the flow of fluid into one or the other of said chambers to cause a building up of the pressure in one chamber above that in the other chamber, and means connecting said chambers through a restriction permitting the leakage of fluid therebetween and the slow dissipation of any pressure differential therebetween.

12. Apparatus for controlling the energization of a fluid pressure actuated servo from a source of fluid under pressure comprising, a passage adapted for connection to the servo, a member movable in opposite directions away from a neutral position in response to opposite changes in a control force, means rigid with said member and providing oppositely facing pressure areas, means cooperating with said pressure areas to define separate fluid filled chambers isolated hydraulically from said servo passage, a main valve having a part rigid with said member and operable to control the flow of fluid between said source and said passage, a separate valve having a part rigid with said member and operable to control the flow of fluid from said source to at least one of said chambers and produce a pressure differential resulting in a force acting on said member in a direction to restore the member toward said neutral position, means yieldably resisting the flow of fluid into one of said chambers and the building up of a pressure differential between the chambers, and means connecting said chambers through a restriction permitting the leakage of fluid therebetween and the slow dissipation of any pressure differential therebetween.

GEORGE FORREST DRAKE.

REFERENCES CITED

The following references are of record in the file of this patent:

UNITED STATES PATENTS

| Number | Name | Date |
| --- | --- | --- |
| 1,718,673 | Wettstein | June 25, 1929 |
| 1,772,403 | Smoot | Aug. 5, 1930 |
| 2,098,914 | Gorrie | Nov. 9, 1937 |